United States Patent [19]

Pelly

[11] Patent Number: 5,006,782
[45] Date of Patent: Apr. 9, 1991

[54] CASCADED BUCK CONVERTER CIRCUIT WITH REDUCED POWER LOSS

[75] Inventor: Brian R. Pelly, Palos Verdes Estates, Calif.

[73] Assignee: International Rectifier Corporation, El Segundo, Calif.

[21] Appl. No.: 366,689

[22] Filed: Jun. 15, 1989

[51] Int. Cl.⁵ .............................................. G05F 1/56
[52] U.S. Cl. .................................. 323/225; 323/266; 323/271
[58] Field of Search ............... 323/224, 225, 266, 267, 323/268, 271, 282, 290; 363/63

[56] References Cited

FOREIGN PATENT DOCUMENTS 0054939  4/1977  Japan ................................ 323/271
0437056  12/1974  U.S.S.R. ........................... 323/267

OTHER PUBLICATIONS

R. D. Middlebrook, "Transformerless DC-to-DC Converters with Large Conversion Ratios", IEEE Transactions on Power Electronics, vol. 3, No. 4, Oct. 1988, pp. 484–488.

*Primary Examiner*—Peter S. Wong
*Attorney, Agent, or Firm*—Ostrolenk, Faber, Gerb & Soffen

[57] ABSTRACT

Two or more buck converter circuits are cascaded in such a manner that the output of one serves as the input to the next, with the input voltage to each succeeding buck converter stage being reduced in magnitude. The total circuit losses are substantially reduced as compared to the losses generated in a single buck converter having the same input voltage range and the same output voltage and output current. Both positive and negative output terminals may be provided for an output stage.

17 Claims, 2 Drawing Sheets

CASCADED BUCK CONVERTER CIRCUIT WITH REDUCED POWER LOSS

BACKGROUND OF THE INVENTION

This invention relates to power supply circuits, and more specifically relates to a novel cascaded buck converter circuit for producing a relatively constant, low output voltage from an input source voltage which may vary over a large range.

Buck converter circuits are well known, and generally comprise a switching transistor connected in series with an inductor, an output capacitor and a diode connected across the series-connected inductor and capacitor circuit, with its forward conduction direction such that it permits current to continue to flow through the inductor when the switching transistor is off. The input voltage may vary over some given range, for example, between 90 volts and 450 volts, and the output voltage is intended to be maintained at a constant voltage, for example, 15 volts. Such a circuit can be used as the power supply for any other electrical circuit or device. The output voltage is maintained constant by properly adjusting or varying the duty cycle of the switching transistor. This can be accomplished by a simple control circuit connected to the control electrode of the switching transistor so that the switching transistor is turned on for a longer or shorter period of time depending upon the sensed output voltage in order to maintain a constant output voltage.

A buck converter chip or power integrated circuit is sold by the International Rectifier Corporation of El Segundo, Calif., the assignee of the present invention, under their trademark "IR2100" and consists of a switching transistor structure and its control circuit integrated on the same chip. The structure of the power section of the chip is disclosed in copending application Ser. No. 07/054,627, filed May 27, 1987, in the name of Daniel M. Kinzer, entitled "HIGH POWER MOSFET AND INTEGRATED CONTROL CIRCUIT THEREFOR FOR HIGH-SIDE SWITCH APPLICATION" and assigned to the assignee of the present invention.

The IR2100 buck converter IC is connected in appropriate electrical circuit relation with an external diode, inductor and capacitor to define the complete buck converter circuit.

Buck converter circuits generate a given power loss during their operation where components of that loss include losses in the switching transistor, the inductor and the diode. Losses associated with the switching transistor are from two sources: the ohmic losses which occur during conduction, and switching losses which occur during commutation of the switching transistor between on and off conditions.

The power conduction loss of the switching transistor can be shown to be generally proportional to the maximum input voltage to be applied to the transistor and inversely proportional to the area of the power chip which is available for current conduction. The reason for these relationships is that the switching transistor must use a higher resistivity epitaxial layer in its construction to withstand higher input voltages and, therefore, will have a higher on-resistance. Thus, the power loss is generally proportional to input voltage. The area of the chip used for the switching transistor must be sufficiently large to handle the output current of the converter circuit. Consequently, higher output converter currents require a larger device area. The on-resistance of the transistor is reduced when area is increased, all other things remaining equal. Therefore, the power loss in the switching transistor is inversely proportional to its current carrying area.

BRIEF DESCRIPTION OF THE INVENTION

In accordance with the present invention, a conventional buck converter circuit is made in cascaded fashion, with the first stage of the buck converter containing a first switching transistor having an adjustable duty cycle to produce a nominally fixed output voltage. The output voltage of the first stage is lower than the minimum input voltage but is higher than the desired final output voltage of the cascaded buck converter. The output voltage of the first stage forms the input voltage of the second stage. The switching transistor in the second stage has a nominally fixed duty cycle sufficient to reduce its input voltage, which corresponds to the output voltage of the first stage, to some fixed output voltage for the second stage. Clearly, any number of stages can be employed.

By using a cascaded arrangement for the buck converter, the total power loss is substantially reduced as compared to the power loss which accompanies a single buck converter circuit for producing the same output power from a given input voltage source. Furthermore, while two switching transistors are used, the total area of the two chips used in the power section of the transistors is smaller than the total area of the single switching transistor for a single buck converter for the same function.

The reason for this unexpected result can be understood from a consideration of a two-stage buck converter in which input voltage varies from 90 to 450 volts and the output voltage is 15 volts.

The first stage will be designed, for example, to reduce input voltage of 450 volts to some constant value, for example, 80 volts (within a tolerance of plus or minus a few volts). This is accomplished by continually adjusting the duty cycle of the switching transistor in the first stage. The current flowing through the switching transistor in the first stage is lower than the current in the second and lower voltage stage. Consequently, the switching loss of the first transistor, which has a high on-resistance because it must withstand the full 450 volts of the input source, is considerably reduced as compared to a switching transistor which must deal with both the full 450 volt input voltage as well as the full current output of the buck converter circuit.

The second stage of the buck converter will also have reduced power loss since its input is lower than that of the switching transistor in the first stage. Therefore, the transistor in the second stage can carry the full current output of the buck converter circuit with lower switching losses and power conduction losses since it is a lower voltage and, therefore, a lower on-resistance device than is the transistor in the first stage.

Consequently, it can be seen that the present invention reduces the combined current and voltage handling requirements for each transistor in each of the various stages as compared to imposing maximum voltage and maximum current ratings on a single transistor in a single stage device.

While each stage may have an identical structure except for certain component values, the stages may differ. As one example, the output stage may be modified in a novel manner to define both a positive and a negative output terminal relative to a ground terminal. The modified output stage described hereinafter can also be used as a single stage buck converter circuit, if desired.

Other features and advantages of the present invention will become apparent from the following description of the invention which refers to the accompanying drawings.

DETAILED DESCRIPTION OF THE DRAWINGS

Figure 1:
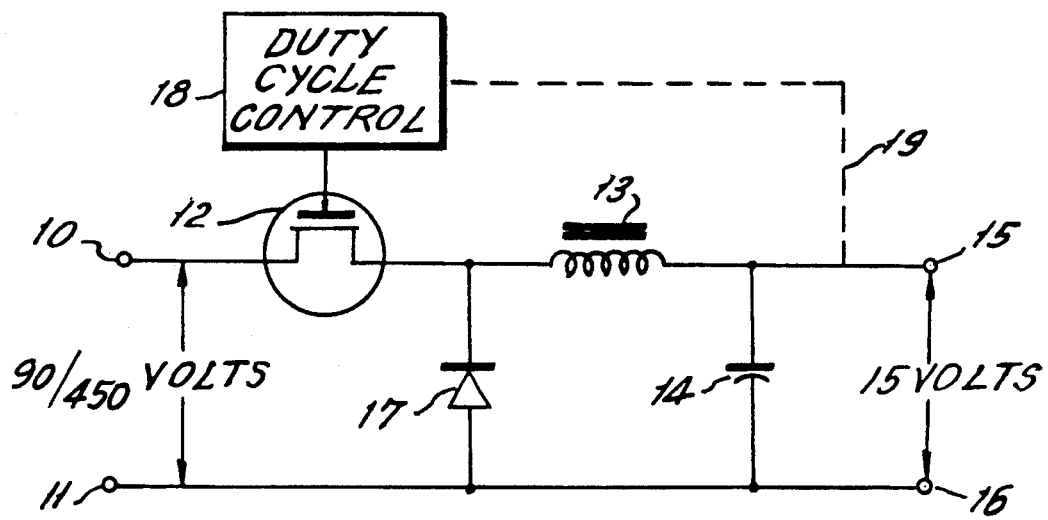
FIG. 1 is a circuit diagram of a prior art single buck converter circuit.

Referring first to FIG. 1, there is shown therein a typical prior art buck converter circuit which comprises input terminals 10 and 11 which may be connected to a source of voltage which could vary between 90 and 450 volts. Any other voltage range could have been selected. A switching transistor 12 shown as a power MOSFET in FIG. 1 is connected in series with an inductor 13 and an output capacitor 14. MOSFET 12 could be replaced by any other desired switching transistor-type device. A pair of output terminals 15 and 16 is connected across capacitor 14 for producing an output voltage selected by the designer, for example, 15 volts plus or minus 0.5 volt. Any other ouput voltage could have been selected which is lower than the smallest input voltage. A fast recovery diode 17 is then connected to the node between MOSFET 12 and inductor 13 and the bus containing terminals 11 and 16.

An appropriate control circuit 18 is connected to the gate of MOSFET 12 to control its duty cycle in such a manner as to maintain the output voltage at terminals 15 and 16 to the preset value, for example, 15 volts. A dotted line 19 schematically illustrates a connection from the output terminals 15 and 16 back to the duty cycle control circuit 18 to accomplish this desired function.

A typical prior art buck converter circuit consists of a power integrated circuit available from the International Rectifier Corporation, named an IR2100 IC in which the power MOSFET 12, duty cycle control circuit 18 and its feedback 19 are integrated on a common chip. The transistor 12 could also be implemented as a discrete power MOSFET, for example, a type IRF820 for a 7.5 watt output circuit with an appropriately designed duty cycle control circuit formed either on a separate IC chip or in discrete form. In a 7.5 watt power supply in which an input voltage of 90 to 450 volts is to be converted to a fixed 15 volt output with an output current of 0.5 ampere, and the switching frequency is 150 kHz, fast recovery diode 17 may be an IR type 30DF6, capacitor 14 may have a capacitance of 0.1 microfarad, and inductor 13 may be a two millihenry inductor.

When carrying out the prior art circuit of FIG. 1 with an IRF2100 buck converter, a total estimated loss of about 7.25 watts is produced by the circuit when its output is 15 volts at 0.5 ampere and its input voltage is 450 V.

The following TABLE I shows the components of this 7.25 watt power loss.

TABLE I

| SINGLE BUCK; 7.5 WATT OUTPUT (150 kHz) | |
|---|---|
| $P_{COND}$ | 0.24 watt |
| $P_{SW}$ | 5.80 watts |
| $P_{SUP}$ | 0.15 watt |
| Diode 17 | 0.40 watt |
| Inductor 13 | 0.66 watt |
| TOTAL | 7.25 watts |

The first component identified as $P_{COND}$ is the loss produced in transistor 12 due to current flow therethrough during the on portion of the duty cycle. The component $P_{SW}$ is the combined switching loss in transistor 12 and diode 17. The loss $P_{SUP}$ is the approximate loss in the control 18 and lead wires and the like. The conduction losses in diode 17 and in inductor 13 are self-explanatory.

As another example of the prior art, the following TABLE II shows the estimated power loss for the circuit of FIG. 1 when the circuit is a 40 watt output circuit, for example, one having a 15 volt output and 2.67 ampere output (through inductor 13). The power conduction losses for the various components as outlined above are shown in TABLE II for such a 40 watt output circuit.

TABLE II

| SINGLE BUCK; 40 WATT OUTPUT (150 kHz) | |
|---|---|
| $P_{COND}$ | 0.72 watt |
| $P_{SW}$ | 5.4 watts |
| $P_{SUP}$ | 0.15 watt |
| Diode 17 | 2.7 watts |
| Inductor 13 | 3.5 watts |
| TOTAL | 12.47 watts |

In carrying out the device as a 40 watt power supply, the MOSFET 12 can be an IRF830 type device, inductor 13 can have an inductance of 375 microhenries, capacitor 14 can have a capacitance of 0.3 microfarad and fast recovery diode 17 can be a 30DF6 type device.

In accordance with the present invention, a novel cascaded arrangement of buck converter circuits is provided to substantially reduce total power loss while producing the same functional result as is produced with a single buck converter.

Figure 2:
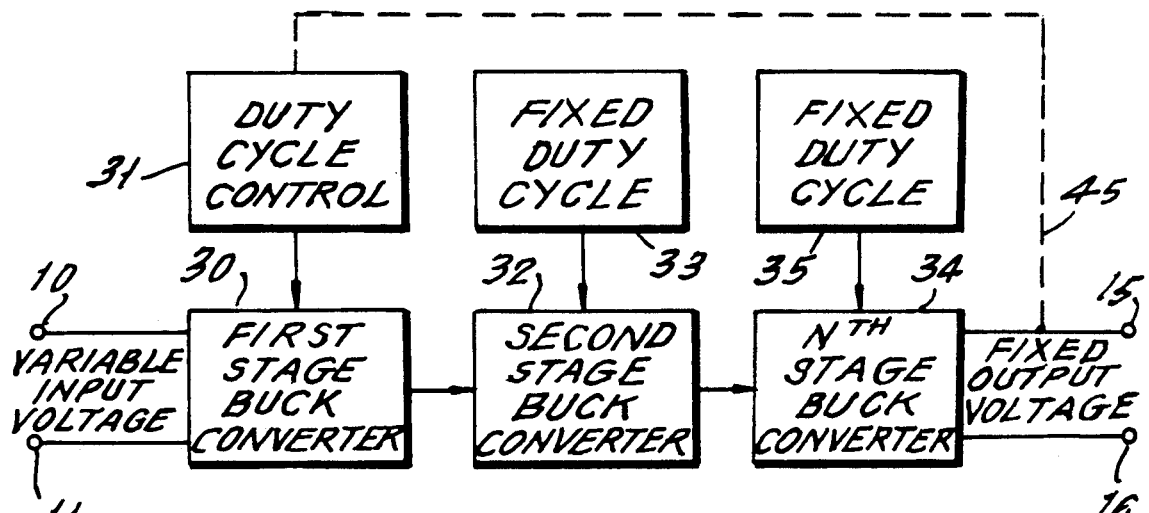
FIG. 2 is a block diagram of an N stage buck converter constructed in accordance with the present invention.

The novel invention is schematically illustrated in FIG. 2 wherein the first stage 30 of a multi-stage buck converter circuit has input terminals 10 and 11 which can receive, for example, a variable input voltage from 90 to 450 V. The circuit of stage 30 is similar to that of the single stage circuit of FIG. 1. Stage 30 has a duty cycle control circuit 31 for controlling the duty cycle of the switching transistor contained within converter stage 30. The output voltage of stage 30 is a reduced output voltage maintained substantially constant by the operation of the duty cycle control circuit 31 which is responsive to the output voltage sensed from the fixed output voltage at terminal 15. Since the second through Nth stage buck converters have nominally fixed duty cycles, and hence nominally fixed input-to-output voltage ratios, the voltage at the output of the first stage buck converter is regulated to an essentially constant value.

The fixed output voltage of the first stage buck converter 30 is then applied to the input terminals of a second stage 32 which can have the same circuit as stage 30. However, the second stage buck converter 32 has a nominally fixed duty cycle control circuit 33 which reduces its output voltage still further to serve as the input voltage of an Nth stage buck converter 34. The Nth buck converter 34 also has its own fixed duty cycle 35 which produces a fixed output voltage, for example, 15 volts at output terminals 15 and 16.

The principle of the invention is to employ plural (two or more) buck converter stages which, in turn, reduce the voltage output of each subsequent stage, with at least one of the stages having variable duty cycle control. In the embodiment of FIG. 2, the first stage has variable duty cycle control to fix the output voltage of the first stage against variations of the input voltage. However, other stages or all or only selected ones of the stages in the chain can have variable duty cycle control, if desired.

Figure 3:
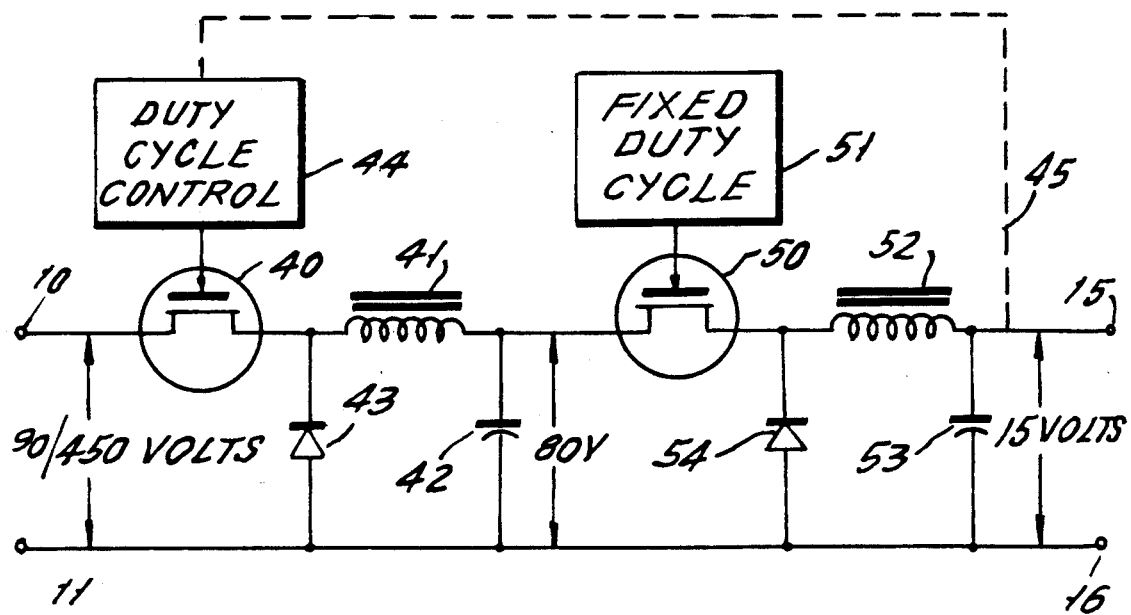
FIG. 3 shows a cascaded two-stage buck converter constructed in accordance with the present invention.

FIG. 3 illustrates a two-stage buck converter constructed in accordance with the invention and can demonstrate numerically the manner in which power losses are reduced by the present invention. Referring to FIG. 3, the first stage of the buck converter circuit consists of input terminals 10 and 11, power MOSFET 40, inductor 41, capacitor 42 and fast recovery diode 43. A duty cycle control circuit 44 is coupled between the gate of MOSFET 40 and the output voltage across capacitor 53. In the example of the invention, the duty cycle control circuit 44 is operated in such a manner as to maintain a fixed output voltage of 15 volts across capacitor 53, which translates to an approximately fixed voltage of 80 V across capacitor 42, for a fixed duty cycle for the second stage of approximately $15/80 = 0.19$. Feedback path 45 is thus coupled to the output of the second stage, as schematically indicated by the dotted lines. Note that the minimum duty cycle of the first stage is approximately $80/450 = 0.18$, compared to that of FIG. 1 of $15/450 = 0.033$, and this can simplify the duty cycle control circuit. For example, if the operating frequency of the circuit of FIG. 1 is 150 kHz, the minimum ON time of transistor 12 is only 220 nanoseconds, for an output-to-input voltage ratio of 15 to 450 V. Even if the frequency of the circuit of FIG. 3 is increased to 300 kHz, the minimum ON time of transistor 40 is still considerably higher—about 590 nanoseconds.

In the components of the first stage of FIG. 3 and assuming that the circuit of FIG. 3 is intended to produce an output power of 7.5 watts or 0.5 ampere at 15 volts, inductor 41 would have an inductance of 15 millihenries, capacitor 42 would have a capacitance of 200 picofarads at 100 volts and diode 43 would be a fast-recovery diode type 10DF6. The current carried by inductor 41 would be about 0.15 ampere.

The second stage of FIG. 3 would consist of a MOSFET 50 which would have a voltage capability of about 100 V and a silicon area about 20% of MOSFET 40. The second stage has a fixed duty cycle circuit 51 for controlling its duty cycle. By way of example, the duty cycle imposed by circuit 51 would be fixed to 15/80.

The second stage further contains inductor 52, capacitor 53 and diode 54. Inductor 52 may have an inductance of 1 millihenry and capacitor 53 may have a capacitance of 0.05 microfarad. The diode 54 can be a Schottky device.

In selecting the MOSFETs 40 and 50 and in view of the difference in the voltage and current which they must carry, higher voltage MOSFET 40 (450 volts) need only have about 50% of the total silicon area needed for the entire circuit of FIG. 1 while lower voltage MOSFET 50 (180 volts) need only have 10% of the total area for the entire circuit of FIG. 1.

The total power loss for the components in the circuit of FIG. 3 for a 7.5 watt output circuit is shown in TABLE III and is 5 W, versus 7.2 W for the circuit of FIG. 1.

TABLE III

| TWO-STAGE BUCK; 7.5 WATT OUTPUT (300 kHz) | |
|---|---|
| FIRST STAGE | |
| $P_{COND}$ | 0.23 watt |
| $P_{SW}$ | 1.74 watts |
| $P_{SUP}$ | 0.15 watt |
| Diode 43 | 0.12 watt |
| Inductor 41 | 0.33 watt |
| SUBTOTAL | 2.57 watts |
| SECOND STAGE | |
| $P_{COND}$ MAX | 1.35 watts |
| $P_{SW}$ | 0.20 watts |
| $P_{SUP}$ | 0.15 watt |
| Diode 54 | 0.40 watt |
| Inductor 52 | 0.33 watt |
| SUBTOTAL | 2.43 watts |
| TOTAL | 5.0 watts |

A comparison of TABLE III and TABLE I shows that the buck converter circuit of FIG. 2 has a substantially lower power loss than that of FIG. 1 while producing the same output. Moreover, there will be a significant reduction in silicon area of the power switching MOSFETs while the total volumes of inductors 41 and 52 are about the same as the volume of inductor 13 of FIG. 1.

As a further illustration of the invention, if the circuit of FIG. 3 were to produce a 40 watt output, it would require an output current at terminals 15 and 16 of 2.67 amperes. For this circuit, MOSFETs 40 and 50 can be IRF820 and IRF510 type MOSFETs, respectively. Diodes 43 and 54 can be type 10DF6 and 50WQ10 diodes and capacitors 42 and 53 can have capacitances of 0.006 and 0.15 $\mu$F, respectively. Inductors 41 and 52 can have inductances of 3800 microhenries and 150 microhenries, respectively.

The power losses which are produced in the circuit of FIG. 3 are tabulated in the following TABLE IV.

TABLE IV

| TWO-STAGE BUCK; 40 WATT OUTPUT (300 kHz) | |
|---|---|
| FIRST STAGE | |
| $P_{COND}$ MAX | 0.38 watt |
| $P_{SW}$ | 1.20 watts |
| $P_{SUP}$ | 0.15 watt |
| Diode 43 | 0.6 watt |
| Inductor 52 | 1.7 watts |
| SUBTOTAL | 4.03 watts |
| SECOND STAGE | |
| $P_{COND}$ MAX | 1.3 watts |
| $P_{SW}$ | 1.0 watt |
| $P_{SUP}$ | 0.15 watt |
| Diode 54 | 1.5 watts |
| Inductor 52 | 1.7 watts |
| SUBTOTAL | 5.65 watts |
| TOTAL | 9.68 watts |

TABLE IV should be compared to TABLE II to see the reduction in power loss occasioned by the use of two cascaded stages instead of a single buck converter stage.

Figure 4:
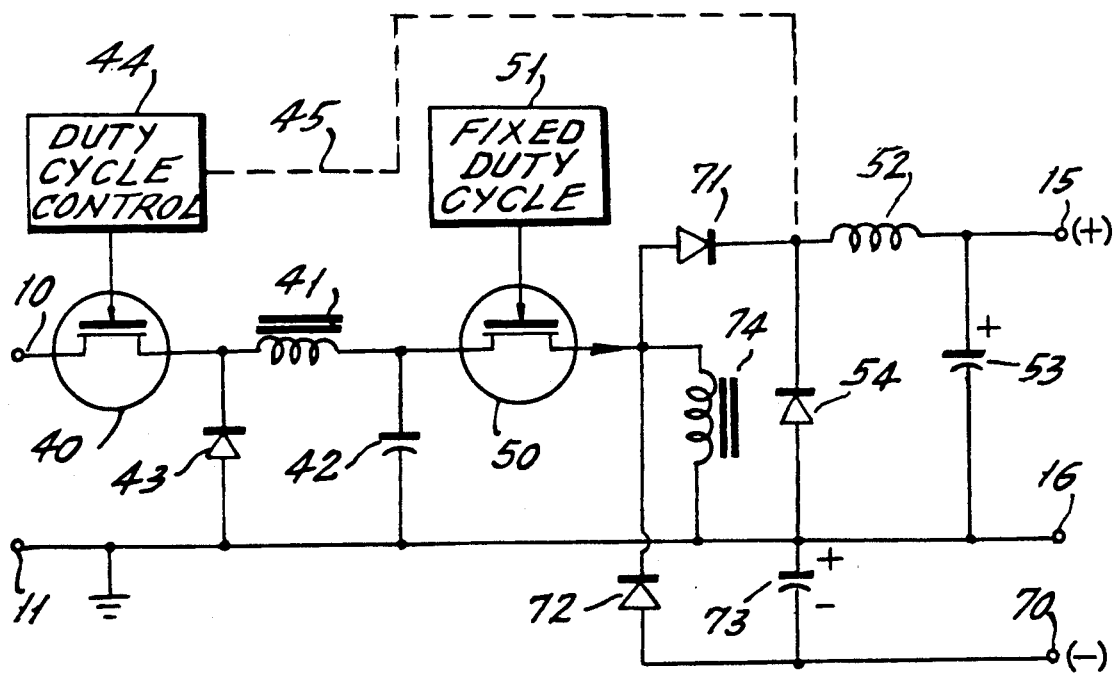
FIG. 4 shows a second embodiment of the invention in which the last stage is modified to define a positive and a negative terminal relative to ground.

FIG. 4 shows an embodiment of the invention as disclosed in FIG. 3, but shows the last buck converter stage modified in circuit design to provide both positive and negative outputs 15 and 70, respectively, relative to ground terminal 16. Thus, FIGS. 1 and 3 show buck converter circuits which conventionally have only a single positive output terminal 15 relative to the ground terminal 16. Circuit users frequently need either or both a positive and a negative output terminal relative to ground. This is provided in the novel second stage circuit of FIG. 4. This novel second stage circuit can also be employed as the only stage of a single buck converter circuit. All components having the same function of those in the circuit of FIG. 3 have the same identifying numerals in FIG. 4.

Two diodes 71 and 72, a capacitor 73 and an inductor 74 are added to the second stage of the cascaded buck converter (or to a single stage, if desired) to power the negative terminal 70. In operation, the output terminal 15 is powered in the usual manner except that the diode 71 is in series with inductor 52. Diode 71, however, permits current flow through inductor 52, charging of capacitor 53 and current through diode 54 when MOSFET 50 is off in the usual manner. The diode 72, inductor 74 and capacitor 73 serve as a negative flyback stage to permit charging of capacitor 73 as shown to define the negative output terminal 70. Diode 72 permits continued current flow through inductor 74 when MOSFET 50 is in the off portion of its duty cycle. Diode 71, in effect, decouples the positive output and negative output circuits.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cascaded buck converter circuit comprising, in combination:
a pair of input terminals for connection to a source of input voltage; a first and a second switching transistor; a first and a second diode, a first and a second inductor and a first and a second capacitor; said pair of input terminals, said first switching transistor, said first inductor and said first capacitor connected in series circuit relation; said first diode connected in parallel with the series connection of said first inductor and said first capacitor thereby to define a first buck converter stage; said first capacitor, said second switching transistor, said second inductor and said second capacitor connected in series circuit relation; said second diode connected in parallel with the series connection of said second inductor and said second capacitor; the terminals of said second capacitor defining a pair of output terminals for connection to one of an output circuit or to a further buck converter stage; said first and second switching transistor being comprised respectively of a first and second power MOSFET each with a respective silicon area, the first and second MOSFET transistors being so selected that the total silicon area of said first and second power MOSFETs is substantially less than a silicon area associated with a single buck converter circuit having the same input and output voltages and the same output current as those of said cascaded buck converter circuit.

2. The circuit of claim 1 which includes control circuit means for controlling the switching frequency of said first switching transistor in a manner as to maintain a given voltage across said first capacitor.

3. The circuit of claim 2 which includes control circuit means for operating said second switching transistor at a substantially fixed duty cycle.

4. The circuit of claim 1 wherein the power losses of said circuit are less than the power loss of a single buck converter circuit having the same input and output voltages and the same output current as those of said cascaded circuit.

5. The circuit of claim 3 wherein said source of input voltage varies from less than about 90 to more than about 450 volts and the output voltage at said output terminals is approximately 15 volts.

6. The circuit of claim 5 wherein the power losses of said circuit are less than the power loss of a single buck converter circuit having the same input and output voltages and the same output current as those of said circuit.

7. A cascaded buck converter circuit comprising, in combination: a first buck converter stage including a first switching transistor means, a first output capacitor and first input terminal means; a second buck converter stage including a second switching transistor means, a second output capacitor and second input terminal means; a variable input voltage connected to said first input terminal means, and control means for modifying the duty cycle of said first switching transistor means to maintain a constant voltage across said first output capacitor; said first output capacitor connected to said second input terminal means; said second switching transistor means having a duty cycle which maintains a given output voltage across said second capacitor; said first and second switching transistor means being comprised respectively of a first and second power MOSFET each with a respective silicon area, the first and second MOSFET transistors being so selected that the total silicon area of said first and second power MOSFETs is substantially less than a silicon area associated with a single buck converter circuit having the same input and output voltages and the same output current as those of said cascaded buck converter circuit.

8. The circuit of claim 7 wherein said output voltage across said second capacitor is a constant voltage regardless of changes in said input voltage.

9. The cascaded buck converter circuit of claim 1 wherein one of said pair of output terminals is a positive output terminal and is connected to a node located between said second capacitor and said second inductor, and wherein the other of said pair of output terminals is a ground terminal.

10. The cascaded buck converter circuit of claim 6 wherein one of said pair of output terminals is a positive output terminal and is connected to a node located between said second capacitor and said second inductor, and wherein the other of said pair of output terminals is a ground terminal.

11. The cascaded buck converter circuit of claim 9 which further includes a third capacitor connected in series with said second inductor and said second capacitor; a node between said second and third capacitors connected to said ground terminal; a negative output terminal; the side of said third capacitor opposite the side connected to said node being connected to said negative output terminal; and circuit means coupling said third capacitor to said second switching transistor to permit the charging of said third capacitor.

12. The cascaded buck converter circuit of claim 10 which further includes a third capacitor connected in series with said second inductor and said second capacitor; a node between said second and third capacitors connected to said ground terminal; a negative output terminal; the side of said third capacitor opposite the side connected to said node being connected to said negative output terminal; and circuit means coupling said third capacitor to said second switching transistor to permit the charging of said third capacitor.

13. The cascaded buck converter of claim 11 wherein said circuit means includes third inductor means connected in series with said second switching transistor and third diode means; said third inductor means and said third diode means connected in closed series relation with at least said third capacitor.

14. The cascaded buck converter of claim 12 wherein said circuit means includes third inductor means connected in series with said second switching transistor and third diode means; said third inductor means and said third diode means connected in closed series relation with at least said third capacitor.

15. A cascaded buck converter circuit, comprising:
   positive, negative and ground output terminals;
   a pair of input terminals for connection to a source of input voltage;
   a first buck converter stage including a first switching transistor means, a first output capacitor and first input terminal means;
   a second buck converter stage coupled between said first stage and said output terminals and including a second switching transistor means; inductor means coupled between said positive output terminal and said second switching transistor; and first and second output capacitors; one side of each of said first and second output capacitors connected to said ground terminal; the other side of said first output capacitor connected to said positive output terminal; the other side of said second output capacitor connected to said negative output terminal; and diode means coupled between said inductor means and said first and second capacitor means to permit charging in series with said inductor means of said first output capacitor from said pair of input terminals when said second switching transistor means is on during its duty cycle and to permit current flow to continue through said inductor means and said first and second capacitors when said second switching transistor means is off during its duty cycle; said first and second switching transistor means being comprised respectively of a first and second power MOSFET each with a respective silicon area, the first and second MOSFET transistors being so selected that the total silicon area of said first and second power MOSFETs is substantially less than a silicon area associated with a single buck converter circuit having the same input and output voltages and the same output current as those of said cascaded buck converter circuit.

16. The buck converter circuit of claim 15 wherein said inductor means comprises first and second inductors connected in respective first and second closed circuits each of which includes said diode means and a respective one of said first and second capacitors.

17. The buck converter circuit of claim 16 wherein said diode means includes first and second diodes connected in said first and second closed circuits, respectively.

* * * * *